United States Patent [19]

Neff et al.

[11] 4,267,862
[45] May 19, 1981

[54] DIRECTIONAL CONTROL VALVE WITH FLOW PATH THROUGH VALVE SPOOL

[75] Inventors: James A. Neff, Bloomfield Township, Oakland County; Richard A. Fagerlie, Union Lake; Walter J. Bowman, Detroit, all of Mich.

[73] Assignee: Mac Valves, Inc., Wixom, Mich.

[21] Appl. No.: 13,387

[22] Filed: Feb. 21, 1979

[51] Int. Cl.³ .......................................... F15B 13/043
[52] U.S. Cl. ......................... 137/625.64; 137/625.66; 137/625.68
[58] Field of Search ...................... 137/625.64, 625.66, 137/625.68

[56] References Cited

U.S. PATENT DOCUMENTS

| | | | |
|---|---|---|---|
| 2,531,511 | 11/1950 | Hill | 137/625.68 |
| 2,536,965 | 1/1951 | Taylor | 137/625.66 |
| 2,591,800 | 4/1952 | Gardiner | 137/625.63 |
| 2,679,235 | 5/1954 | Van Meter | 137/625.68 |
| 2,709,421 | 5/1955 | Avery | 137/625.63 |
| 3,038,850 | 6/1962 | Lansky et al. | 137/596.15 |
| 3,238,972 | 3/1966 | Bowman | 137/625.66 X |
| 3,949,645 | 4/1976 | Masclet | 147/625.64 X |

*Primary Examiner*—Gerald A. Michalsky
*Attorney, Agent, or Firm*—Robert G. Mentag

[57] ABSTRACT

A four-way directional control air valve having a valve body in which is formed a valve spool bore having a valve spool movably mounted therein. The valve spool bore has a pair of longitudinally spaced apart air supply chambers formed in the wall thereof. An exhaust chamber is formed in the wall of the valve spool bore in a longitudinal central position between the pair of air supply chambers. A first cylindrical chamber is formed in the wall of the valve spool bore in an intermediate position between the exhaust chamber and one of said air supply chambers. A second cylinder chamber is formed in an intermediate position in the wall of the valve spool bore between an exhaust chamber and the other air supply chamber. The valve spool has a pressurized air flow chamber formed therethrough, and it is connected to the air supply chambers formed in the valve spool bore to provide an air supply flow path through the valve spool. The valve spool is adapted to be moved to a first positon to connect one of the air supply chambers to the first cylinder chamber and the exhaust chamber to the second cylinder chamber, and to a second positon to connect the other air supply chamber to the second cylinder chamber and the exhaust chamber to the first cylinder chamber. In one embodiment, the valve spool is shifted in one direction by pilot air or a spring means to a first position, and by pilot air in the other directon to a second position. In another embodiment, the valve spool is shifted to first and second positions by pilot air, and to a third neutral position by a spring or a spring with air assist means mounted in the air flow chamber in the valve spool.

11 Claims, 13 Drawing Figures

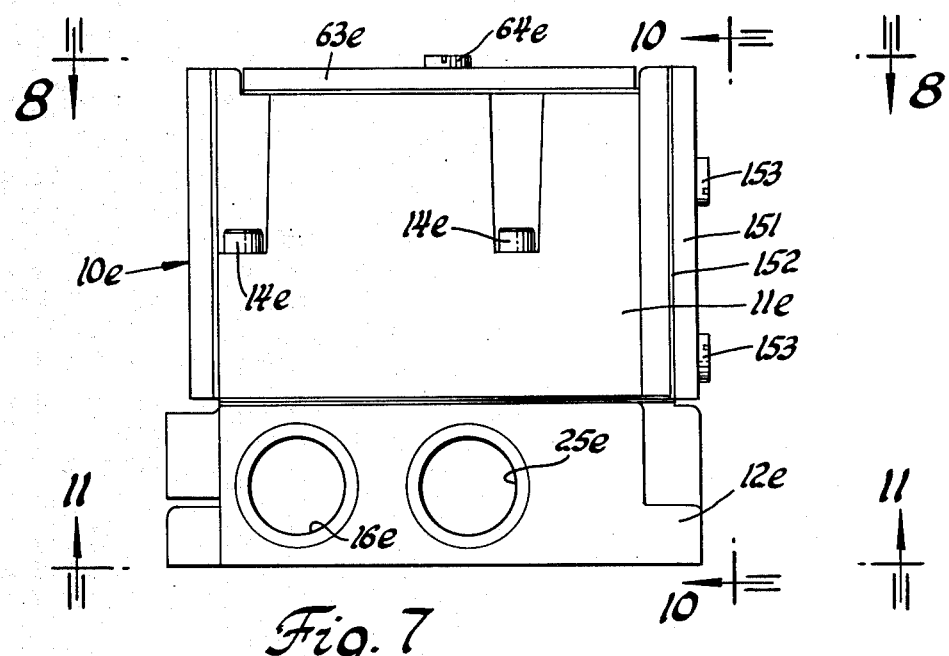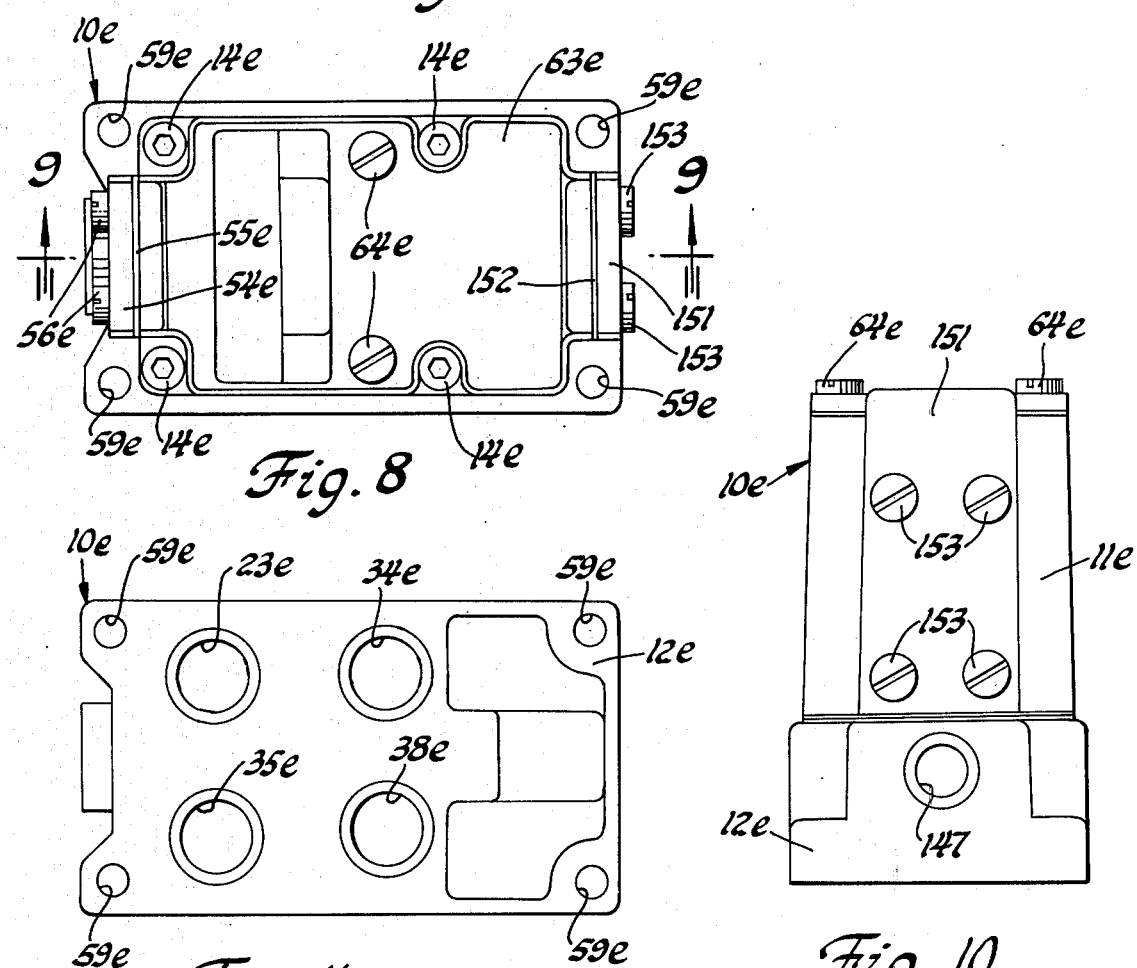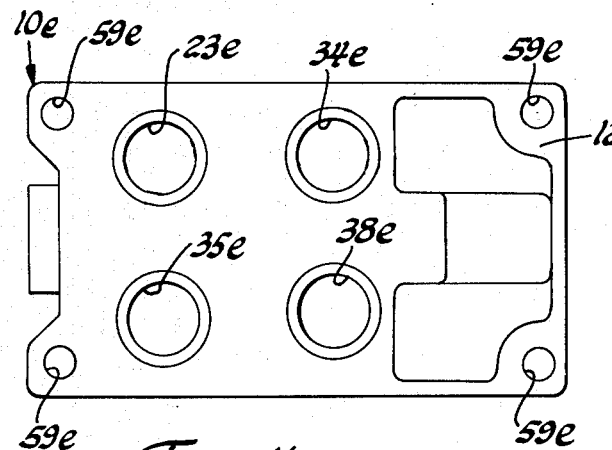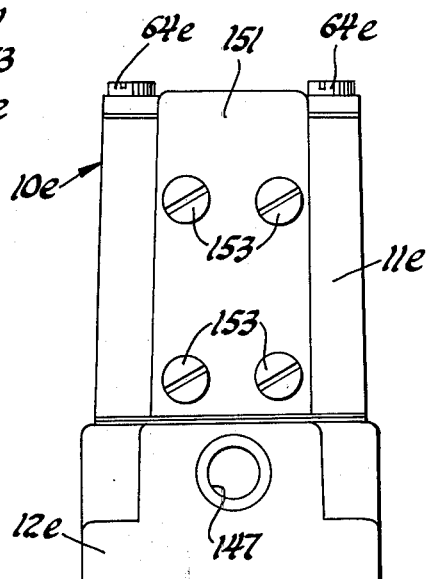

DIRECTIONAL CONTROL VALVE WITH FLOW PATH THROUGH VALVE SPOOL

BACKGROUND OF THE INVENTION

1. Field of the Invention

This invention relates to four-way directional control air valves of the type used in the control of the flow of pressurized air to and from various apparatuses, such as an air cylinder, and similar devices.

2. Description of the Prior Art

It is known in the prior art to provide four-way differential air control valves which have a valve spool that is moved in one direction by pilot air, and in the other direction by a return spring, or movable in two opposite directions by pilot air. A disadvantage of the prior art four-way valves is that they include two exhaust chambers in the valve spool bore which involve complicated flow paths through the valve body for combining the two exhaust chambers and connecting them to an exhaust outlet port. The prior art requirement of two exhaust chambers in the valve spool bore of the valve results in many restrictions in the exhaust flow path which detracts from the operating efficiency of an air valve. A further disadvantage of said prior art air valves is that the air supply chamber in the valve spool is normally positioned in the center of the valve spool bore, and such a position is a disadvantage where the valve main air supply must also be conducted internally to the ends of the valve body for conduction to one or more pilot air valves for operating the main valve spool in the spoolvalve.

SUMMARY OF THE INVENTION

In accordance with the invention, a four-way directional control air valve is provided with a valve body in which is formed a valve spool bore having a valve spool movably mounted therein. The valve spool bore has a centrally formed exhaust chamber. A cylinder chamber is formed in a longitudinally spaced apart position on either side of the exhaust chamber. An air supply chamber is formed in the valve bore in a longitudinal outward, spaced apart position from each cylinder chamber, whereby the valve spool bore has two air supply chambers, two cylinder chambers and one central exhaust chamber. The valve is provided with an air supply inlet port which is connected by internal passageways to one of the supply chambers, and by an internal flow path in the valve spool to the other air supply chamber. The valve spool has two operative flow positions, and it can be moved in one direction by pilot air and in the other direction by a return spring assisted by the air supply pressure in the flow path through the valve spool. The valve spool may alternatively be moved to its two operative positions by pilot air, and in the last described valve structure, the valve spool may be moved to a neutral third position by a spring, or a spring with air assist means mounted internally in the valve spool flow path. The last described valve structure may be either a closed center, an open center, or a pressure center valve.

BRIEF DESCRIPTION OF THE DRAWINGS

FIG. 7 is a side elevation view of a two-position, four-way valve which is a directional control air valve made in accordance with the principles of the present invention.

FIG. 8 is a top plan view of the valve illustrated in FIG. 7, taken along the line 8—8 thereof, and looking in the direction of the arrows.

FIG. 10 is a side elevation view of the valve illustrated in FIG. 7, taken along the line 10—10 thereof, and looking in the direction of the arrows.

FIG. 11 is a bottom plan view of the valve illustrated in FIG. 7, taken along the line 11—11 thereof, and looking in the direction of the arrows.

DESCRIPTION OF THE PREFERRED EMBODIMENTS

Figure 1:
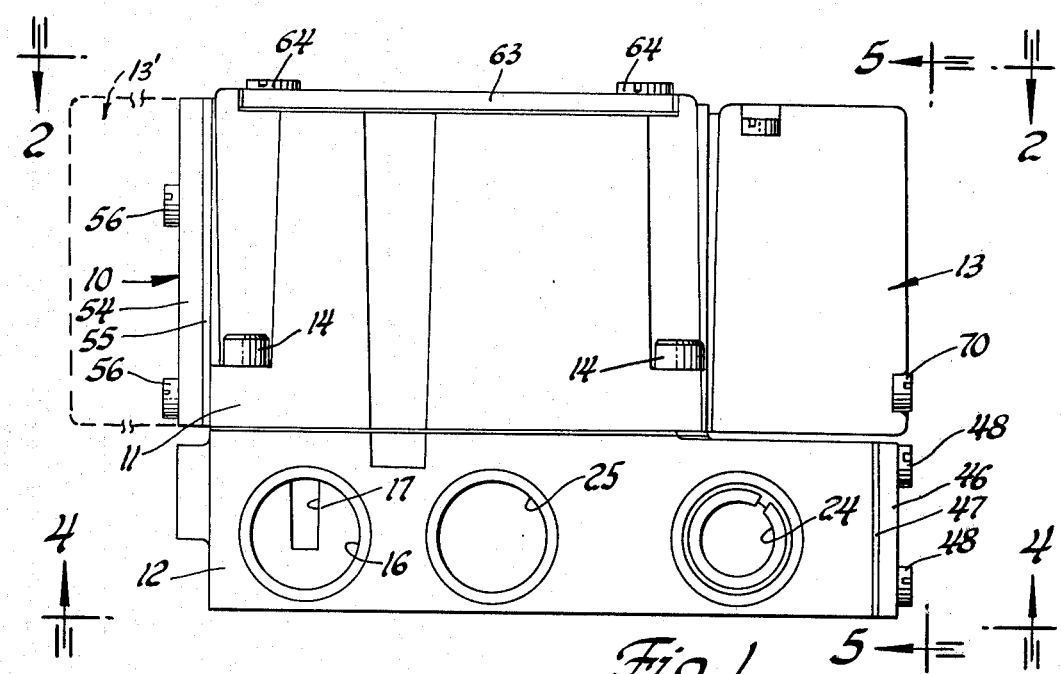
FIG. 1 is a side elevation view of a two-position, four-way directional control air valve made in accordance with the principles of the present invention.
Figure 2:
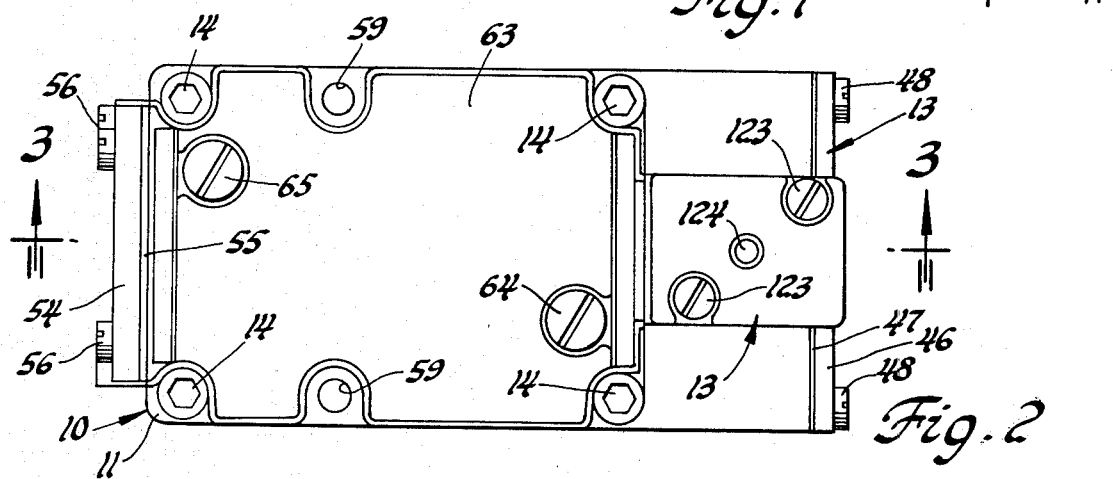
FIG. 2 is a top plan view of the valve illustrated in FIG. 1, taken along the line 2—2 thereof, and looking in the direction of the arrows.
Figure 3A:
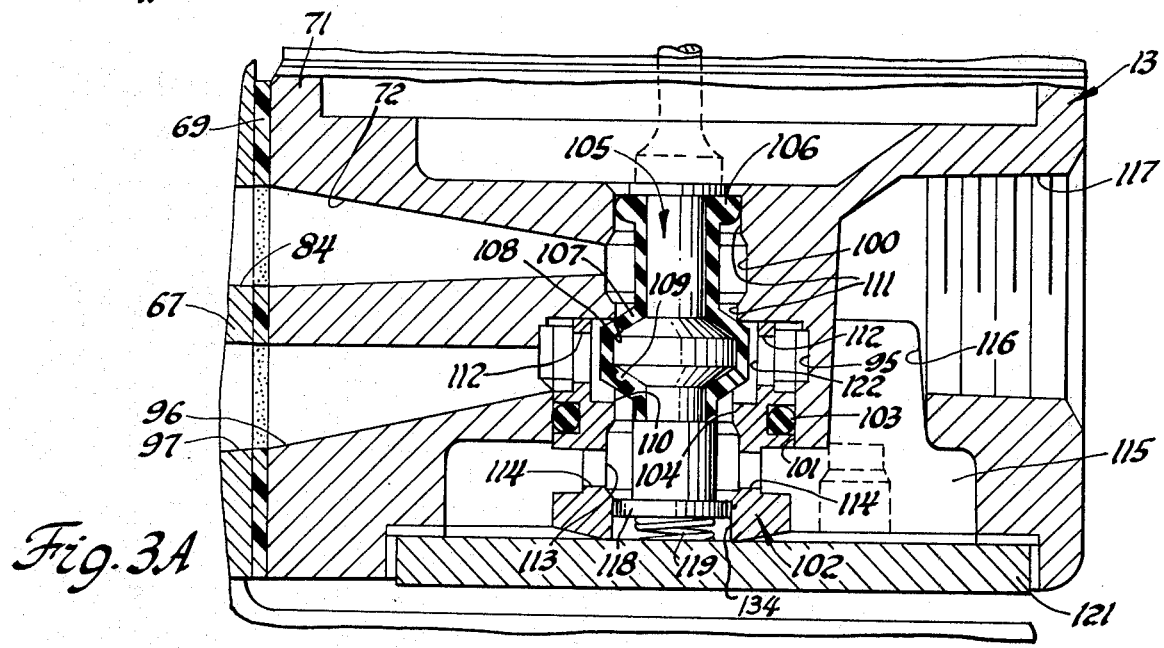
FIG. 3A is an enlarged, fragmentary elevation section view of the pilot valve shown in FIG. 3.
Figure 3:
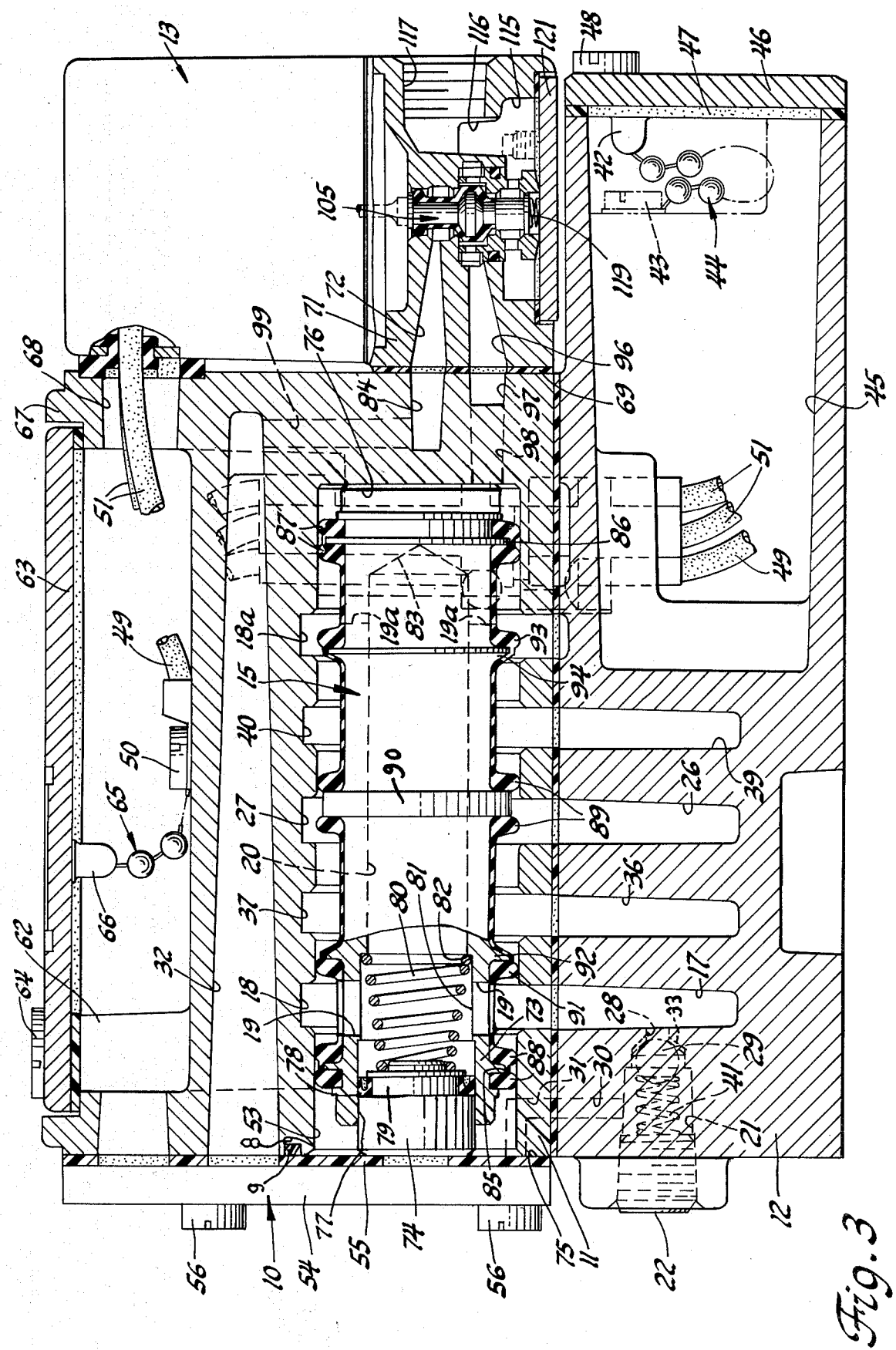
FIG. 3 is an enlarged, longitudinal section view of the valve illustrated in FIG. 2, taken along the line 3—3 thereof, and looking in the direction of the arrows.

Referring now to the drawings, and in particular to FIGS. 1, 2 and 3, the numeral 10 generally designates a two position, four-way directional control air valve made in accordance with the principles of the present invention. The valve 10 includes a valve body 11 which is detachably mounted on a base member 12 by a plurality of suitable machine screws 14 (FIG. 2). The numeral 13 generally designates a conventional solenoid controlled three-way pilot valve for operating the valve spool, generally indicated by the numeral 15, of the valve 10 in one direction, with the valve spool 15 being returned in the other direction by a return spring, as described in detail hereinafter. The valve spool 15 may be operated in both directions by two solenoid valves like the valve 13.

As shown in FIG. 1, the valve 10 is provided with an inlet or supply port 16, in the base member 12, which would be connected to a suitable source of pressurized air. The inlet port 16 communicates through suitable passageways in the base member 12 with a passageway 17, which communicates at its upper end (FIG. 3) with a pressurized air supply chamber 18 in the valve body 11. The supply chamber 18 is annularly formed in the usual manner about the valve spool 15 in the longitudinal bore 53 in which the valve spool 15 is slidably mounted. The supply chamber 18 is located at one end of the valve body 11, as compared to the usual or prior art position wherein the pressurized air inlet or supply chamber is normally centrally disposed in the valve bodies of the prior art four-way valves.

As shown in FIG. 3, the supply chamber 18 communicates through a plurality of ports 19, which are radially formed through the side wall of the valve spool 15, at the left end thereof. The ports 19 communicate with an elongated, internal axial air supply chamber 20. As shown in FIG. 3, the air supply chamber 20 is extended to the right end of the valve spool 15, and it communicates with a second plurality of radial ports 19a formed through the outer walls of the valve spool 15. The ports 19 and 19a extend through the elastomeric material molded around the valve spool 15. The radial ports 19a communicate with the valve spool bore 53, and with a second supply chamber 18a which is located adjacent the right end of the valve body 11 in a position longitudinally spaced apart from the first named supply chamber 18. It will be seen that the supply chamber 20 forms a flow path through the valve spool 15 for supplying operating, pressurized air for the valve 10 from a single inlet while allowing the employment of a pair of longitudinally spaced apart supply chambers for cooperation with the valve spool 15.

Figure 4:
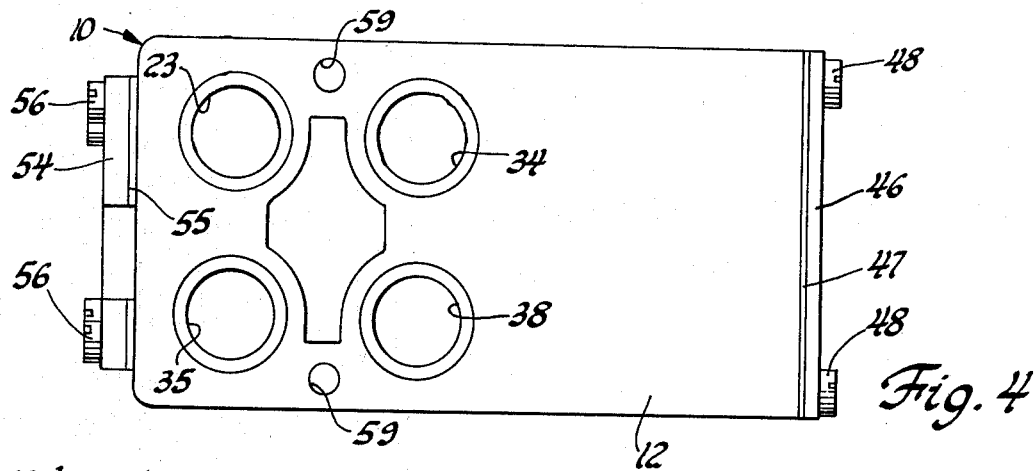
FIG. 4 is a bottom plan view of the valve structure illustrated in FIG. 1, taken along the line 4—4 thereof, and looking in the direction of the arrows.

Normally, the standard base member 12 is provided with either side or bottom ports, but not both. If the base member 12 is provided with both bottom and side ports, then the ones that are used are plugged. However, such a construction would only be available on special base members. FIG. 4 shows the base member 12 provided with an optional supply port 23 in the bottom end wall, and it would be connected by suitable passageways formed through the base member 12 to the passageway 17.

As shown in FIG. 1, the numeral 24 designates an electrical connection port for the reception of lead wires from a suitable source of electric power for connection to the solenoid lead wires 51, which are illustrated in FIG. 3. The numeral 25 in FIG. 1 indicates an exhaust outlet port. The exhaust outlet port is connected by a suitable passageway in the base member 12 to the passageway 26 (FIG. 3). The passageway 26 is connected to the exhaust chamber 27 which is annularly formed in the wall of the valve spool bore 53, in a centrally disposed position between the supply chambers 18 and 18a, and in a position spaced apart therefrom.

The prior art four-way, four ported valves normally have a central single supply chamber disposed in the position of said exhaust chamber 27, and they normally have two exhaust chambers in the positions of the supply chambers 18 and 18a that are combined in the valve body, or the valve base, or both. The positioning of the exhaust chamber 27 in the central position between the two supply chambers 18 and 18a eliminates the need to combine the exhaust chambers within the body or base castings, thus providing the most optimum exhaust flow path achievable through the valve body 11. The provision of an optimum exhaust flow path in the aforedescribed valve structure is achieved without detracting from the efficiency of the pressurized air supply flow path, since the supply flow path through the valve spool chamber 20 supplies only cylinder chamber 40 which in most cases is the port with the lowest flow requirement, that is, the rod end of a double acting cylinder.

As illustrated in FIG. 3, the air supply passage 17 is operatively connected to an accumulator chamber 32 which is formed in the upper end of the valve body 11. The accumulator chamber 32 is adapted to supply the pilot valve 13 with pressurized pilot air for operating the valve spool 15. The air supply passageway 17 is connected through a passageway 28 to an enlarged diameter passageway 21, and thence to a passageway 30 in the base member 12. The passageway 30 communicates with a passageway 31 in the valve body 11, which communicates with a vertical passageway (not shown) in gasket 55 which communicates with the accumulator chamber 32. The outer end of the passageway or bore 21, in the base member 12, is enclosed by a suitable pipe plug 22. It will be seen that a separate supply of pressurized pilot air could be supplied to the accumulator chamber 32 through the passageway 21 by removing the pipe plug 22.

As shown in FIG. 3, a ball check valve 29 is adapted to be seated on a valve seat formed at the end of passageway 28 where it communicates with the tapered inner end of the passageway or bore 21. The ball check valve 29 is normally held on its valve seat by a suitable spring 41. It will be understood that the ball check valve 29 would be opened by the flow of pressurized air from the passageway 17 into the passageway 28, to permit a full supply of pressurized pilot air to be supplied to the accumulator chamber 32. However, it will also be understood that if there are any fluctuations of pressure in the supply of pressurized air, that the spring 41 will close the ball check valve 29, and the accumulator chamber 32 will retain a volume of air sufficient to keep the valve 10 cycling for a number of operations. As shown in FIG. 3, a pair of bleed slots 33 are formed in the base member 12 along the inner tapered portion of the bore 21, adjacent the ball check valve 29, to allow the air pressure in the accumulator chamber 32 to bleed out to the passageway 17 when the valve 10 is shut down, or there is a pressure drop in the air supply system.

As shown in FIG. 4, the base member 12 has an optional exhaust outlet port 34 formed through the bottom end wall thereof. It will be understood that the optional exhaust outlet port 34 is connected by suitable passageways in the base member 12 with the exhaust passageway 26.

As shown in FIG. 4, a first optional cylinder or working port 35, and a second optional cylinder or working port 38, may be formed through the bottom end wall of the base member 12. The cylinder ports 35 and 38 would be operatively connected by suitable passageways formed through the base member 12 with the cylinder passageways 36 and 39, respectively, (FIG. 3). The standard set of first and second cylinder side ports are formed in the base member 12 in the usual manner, on the side opposite to the side shown in FIG. 1 wherein the inlet and exhaust ports are located, and they are connected by suitable passageways to the cylinder passageways 36 and 39.

As shown in FIG. 3, the cylinder passageways 36 and 39, are connected to the annular cylinder chambers 37 and 40 which are formed in the valve spool bore 53. As shown in FIG. 3, the cylinder chamber 37 is formed in a position centrally spaced apart from the supply chamber 18 and the exhaust chamber 27. The cylinder chamber 40 is similarly disposed in a central position between the supply chamber 18a and the exhaust chamber 27.

As shown in FIG. 3, an electrical conductor chamber 45 is formed on the base member 12, and it communicates with the inlet conduit port 24. The chamber 45 is enclosed on the right hand thereof by a suitable gasket 47 and cover plate 46. The cover plate 46 is secured to the base member 12 by suitable machine screws 48

(FIG. 1). The cover plate 46 is provided with a suitable retainer chain, generally indicated by the numeral 44, which has one end secured at the point 42 to the inner face of the cover plate 46, and the other end secured to the base plate 12 by a suitable machine screw 43.

As shown in FIG. 3, the left end of the valve body 11 is enclosed by a suitable cover plate 54 and a gasket 55. The cover plate 54 is secured in place by a plurality of suitable machine screws 56. The left end of the valve spool bore 53 is vented to the atmosphere through a connected vent chamber 8 and a passageway provided with a suitable filter 9. As shown in FIGS. 2 and 4, the valve 10 is provided with suitable vertical mounting holes 59 for mounting the valve 10 in a desired position.

Figure 5:
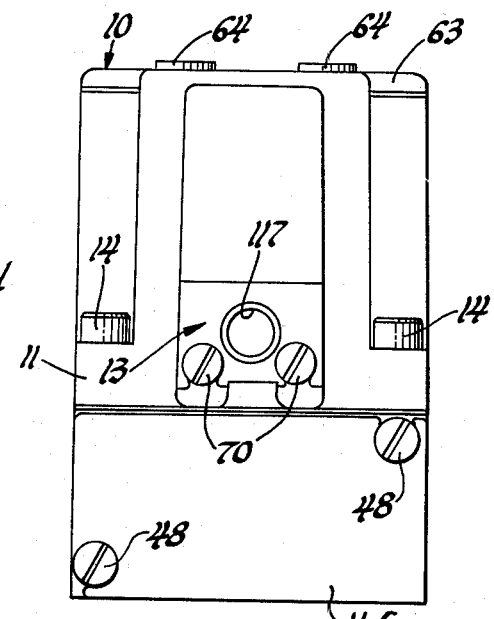
FIG. 5 is a right side elevation view of the valve illustrated in FIG. 1, taken along the line 5—5 thereof, and looking in the direction of the arrows.

As shown in FIG. 3, a ground wire 49 and the solenoid lead wires 51 extend upwardly from the lower chamber 45 into an upper chamber 62 in the valve body 11. The chamber 62 is enclosed by a suitable cover 63 which is secured in place by suitable machine screws 64 (FIG. 2). The inner end of the ground wire 49 is secured to the valve body 11 in the chamber 62 by a suitable machine screw 50. A suitable retainer chain, generally indicated by the numeral 65, has one end secured to the valve body 11 and the other end secured at the point 66 to the inner face of the cover plate 63. As shown in FIG. 3, the solenoid lead wires 51 extend from the chamber 62 through a passageway 68 formed through the right end wall 67 of the valve body 11, and into the solenoid operated pilot valve 13. As shown in FIG. 3, the solenoid 13 is detachably connected to the right end of the valve body 11 by a gasket 69 and a pair of suitable machine screws 70 (FIG. 5).

As shown in FIG. 3, the left end 73 of the valve spool 15 has a piston cylinder or cylindrical chamber 77 formed therein from the outer end thereof, and it is formed to a larger diameter than the air supply bore or passage 20. The inner end of the piston chamber 77 communicates with a smaller diameter bore 81, which is slightly smaller in diameter than the piston cylinder 77 but larger in diameter than the air flow chamber 20. A shoulder 82 is formed at the junction of the inner end of the bore 81 in the left end of the air supply bore 20. The air supply bore 20 extends to the right from the shoulder 82 and terminates in a tapered end wall, indicated by the numeral 83 in FIG. 3.

As shown in FIG. 3, a cylindrical piston 74 has its inner end mounted in the cylinder bore 77. The valve spool 15 is adapted to be slidably mounted over the outer periphery of the piston 74. The outer end of the piston 74 is held in an immovable position against the inner face 75 of the cover plate gasket 55 by a return spring 80. A reduced diameter extension 79 is integrally formed on the inner end of the piston 74, and the outer end of the return spring 80 is seated against said piston extension 79. The inner end of the return spring 80 is disposed in the bore 81, and it seats on the shoulder 82 formed at the junction of the bore 81 and the flow path bore 20. The piston extension 79 is provided with suitable seal means 78 around the periphery thereof, for sealing engagement with the wall of the piston cylinder 77. The return spring 80 normally biases the valve spool 15 to the right to the position shown in FIG. 3.

As shown in FIG. 3, the valve spool 15 is provided at the left end thereof with an integral, peripheral flange 85 which extends radially outward from the outer periphery thereof, and a similar flange 86 at the right end thereof. A pair of molded annular seal members 88 are formed on the opposite sides of the flange 85, and a similar pair of molded annular seal members 87 are formed on the opposite sides of the peripheral flange 86. The seal members 87 and 88 sealingly engage the inner surface of the valve spool bore 53.

The valve spool 15 is provided with a centrally disposed peripheral flange 90 which extends radially outward therefrom, and which has a molded annular seal member 89 formed on each side thereof to function as valve seals for controlling the flow of exhausting fluid from the cylinder chambers 37 and 40 to the exhaust chamber 27.

The valve spool 15 has a radial flange 92 formed around the periphery thereof, in a position centrally disposed between the end seals 88 and the exhaust valve seals 89. An annular valve seal 91 is formed on the supply chamber side of the flange 92. The flange 92 has a straight radial surface on the side on which the valve seal 91 is molded, whereas on the opposite side it has an inwardly tapered outer surface over which a thin layer of elastomeric material is molded. The valve spool 15 has a second annular radial flange 94 formed centrally between the end seals 87 and the valve seal members 89. The flange 94 is shaped in the same manner as the previously described flange 92, and it has an annular valve seal 93 formed on the straight radial surface, on the outer side thereof, facing the supply port 18a.

The solenoid controlled pilot valve 13 is illustrated in an enlarged cross section view in FIG. 3A. It will be understood that any conventional pilot valve may be employed, and that the particular structure of the pilot valve 13 as illustrated, does not form any specific part of the invention.

As shown in FIG. 3A, the pilot valve 13 includes a valve body 71 in which is formed a pilot air inlet passageway 72. As shown in FIG. 3, the pilot air inlet passageway 72 communicates with a passageway 84 in the valve body 11. The passageway 84 communicates with the lower end of a vertically disposed passageway 99 that communicates at its upper end with the accumulator chamber 32. As shown in FIG. 3, a pilot air cylinder or outlet passageway 96 is formed through the valve body 71, and it communicates at its outer end with a passageway 97, in the valve body 111, which communicates with the inner closed end of the valve spool bore 53.

As shown in FIG. 3A, the valve body 71 has an axial bore 111 formed therethrough, which has an annular groove 100 formed in the wall thereof which communicates with the inner end of the pilot air inlet passageway 72. The bore 111 is formed inwardly from the upper end of the valve body 71, and it terminates at the inner end of an enlarged diameter bore 101 which extends inwardly from an exhaust chamber 115. The exhaust chamber 115 communicates through a passageway 116 with an exhaust port 117.

A peripheral groove 95 is formed in the wall of the bore 101, and it communicates with the pilot air outlet passageway 96. A valve spool retainer, generally indicated by the numeral 102, is mounted in the bore 101, from the lower end thereof, and it carries an O-ring seal 103 around the periphery thereof, which is disposed below the annular groove 95, and which sealingly engages the wall of the bore 101.

As shown in FIG. 3A, a poppet valve spool, generally indicated by the numeral 105, has its lower portion movably mounted in the valve retainer 102 in a stepped bore formed by the communicating bores 122, 104, 113 and 134, with its upper end extended upwardly into the bore 111 in the valve body 71. A suitable annular seal member 106 is formed around the upper end of the poppet valve spool 105, and it sealingly engages the wall of the bore 111. An upper, sharp edged valve seat 108 is formed at the junction of the inner end of the bore 111 and the upper end wall of the bore 101, and it is normally engaged by a first conical seal member 107 that is molded on the valve spool 105. The valve spool 105 is normally moved to the closed position shown in FIG. 3A by a return spring 119 so as to normally maintain the valve 107 on the valve seat 108 to block the flow of pilot air to the outlet passageway 96. The upper end of the return spring 119 engages the enlarged lower end 118 of the poppet spool valve 105. The lower end of the spring 119 is seated against a plate 121 which covers the open lower end of the exhaust chamber 115. The plate 121 is secured to the valve body 71 by any suitable means, as by suitable machine screws (not shown).

As shown in FIG. 3A, a lower, sharped edged annular valve seat 110 is formed at the junction point between the valve retainer bores 104 and 122. When the solenoid in the pilot valve 13 is energized, the valve spool 105 is moved downwardly from the position shown in FIG. 3A so as to move the lower conical annular valve member 109, which is molded onto the valve spool 105, into a seating engagement on the lower valve seat 110. When the valve spool 105 is moved downwardly into seating engagement on the lower valve seat 110, the pilot air may pass from the inlet passageway 72 and through the annular groove 100, and thence downwardly through the bore 111 and into the bore 122. Pilot air may then flow out through the radial passageways 112 formed through the retainer 102 and into the annular groove 95, and thence out through the outlet passageway 96. When the solenoid for the pilot valve 13 is de-energized, the return spring 119 moves the poppet valve spool 105 upwardly into the normally closed position shown in FIG. 3A, to again open the cylinder passageway 96 to the exhaust port 117. Under the last mentioned condition, the inner end of the passageway 96 communicates through the annular groove 95 and the passageways 112 with the bore 122 in the valve retainer 102. The exhausting pilot air then flows through the annular valve seat 110 and down through the bore 104 and into the bore 113, and thence radially outward through the radial passageways 114 which are formed in the valve spool retainer 102, and into the exhaust chamber 115. The exhausting pilot air then passes out through the passageway 116 and into the exhaust port 117.

In use, the valve spool 15 would be disposed in the initial position shown in FIG. 3, with the pilot valve poppet spool 105 in the normally closed position shown in FIG. 3A. It will be seen that when the valve spool 15 is in the initial position shown in FIG. 3, that the supply air flows into the valve 10 through the inlet port 16 and into the passageway 17, and thence upwardly into the supply chamber 18 and through the ports 19 and into the flow path bore 20 in the spool valve 15. The supply air also flows out of the ports 19a into the bore 53 and into the right end supply chamber 18a.

In the valve illustration shown in FIG. 3, the supply air is flowing from the supply chamber 18a past the annular valve seal member 93 and through the valve spool bore 53 and into the cylinder chamber 40, from where it passes out through the passageway 39 and the cylinder port 38 and thence through a conduit to one end of a fluid apparatus being controlled by the valve 10. Simultaneously, the other end of the fluid apparatus being controlled is exhausted through a suitable conduit into the cylinder port 35, and thence through the passageway 36 and into the cylinder chamber 37, from where it flows through a valve spool bore 53 and into the exhaust chamber 27. The exhausting air then flows down through the passageway 26 and out through the exhaust port 25 shown in FIG. 1.

It will be seen that the inlet pressure in the supply chamber 18 reacts against the open side of the annular valve seal 91, so that the valve seal 91 will extrude under the air pressure, against the metal back-up flange 92, and provide an efficient sealing contact with the bore of the valve spool 53. The same efficient sealing contact is formed between the other annular seal member 93, which functions with the other supply cylinder 18a when the valve spool 15 is shifted to the left, as described hereinafter.

When the solenoid in the pilot valve 13 is energized, the poppet valve spool 105 is moved downwardly to open the flow path, as previously described hereinbefore, between the pilot air inlet passageway 72 and the outlet passageway 96, to admit air through the passageway 97 into the closed end of the valve spool bore 53, so as to engage the closed end of the valve spool 15 and shift the valve spool 15 to the left, as viewed in FIG. 3, against the pressure of the return spring 80. The valve spool 15 is shifted to the left so as to move the annular exhaust seals 89 to the left of the exhaust chamber 27 and open the passageway between the cylinder port 40 and the exhaust chamber 27, and close the passageway between the exhaust chamber 27 and the cylinder port 37. Simultaneously, the annular seal 93 is moved to the left to close the passageway between the cylinder chamber 40 and the supply chamber 18a, and to open the passageway between the supply chamber 18 and the cylinder chamber 37. In the last described position of the valve spool 15, the flow of pressurized air to the fluid control apparatus being controlled is reversed, with the pressurized air now flowing into the cylinder chamber 37 and being exhausted from the cylinder chamber 40. When the solenoid of the pilot valve 13 is de-energized, the flow of pilot air into the outlet passageway 96 is blocked, and the outlet passageway 96 is in communication with the pilot valve exhaust port 117 to exhaust the pilot air from the right end of the valve spool bore 53, and permit the return spring 80 to move the valve spool 15 back to the initial position shown in FIG. 3. The supply air in the bore 20 in the valve spool 15 reacts against the closed end 83 of the valve spool 15 and provides an air assist return action that supplements the action of the return spring 80.

Figure 6A:
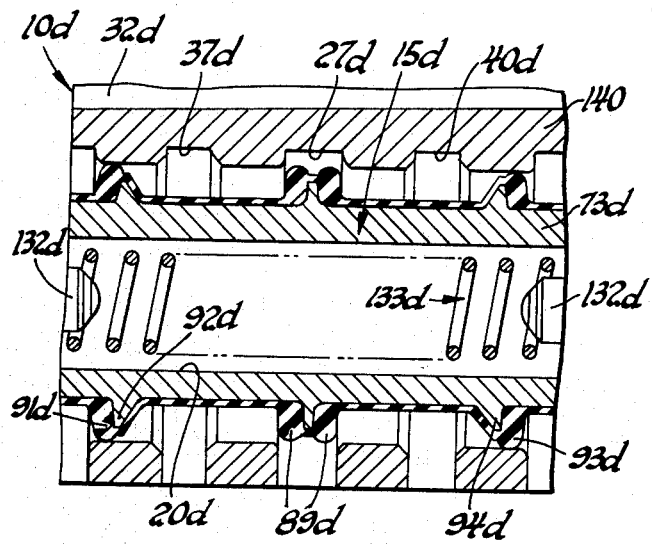
FIG. 6A is a fragmentary, elevation section view of a modified three-position, open center, three-way directional control air valve.
Figure 6:
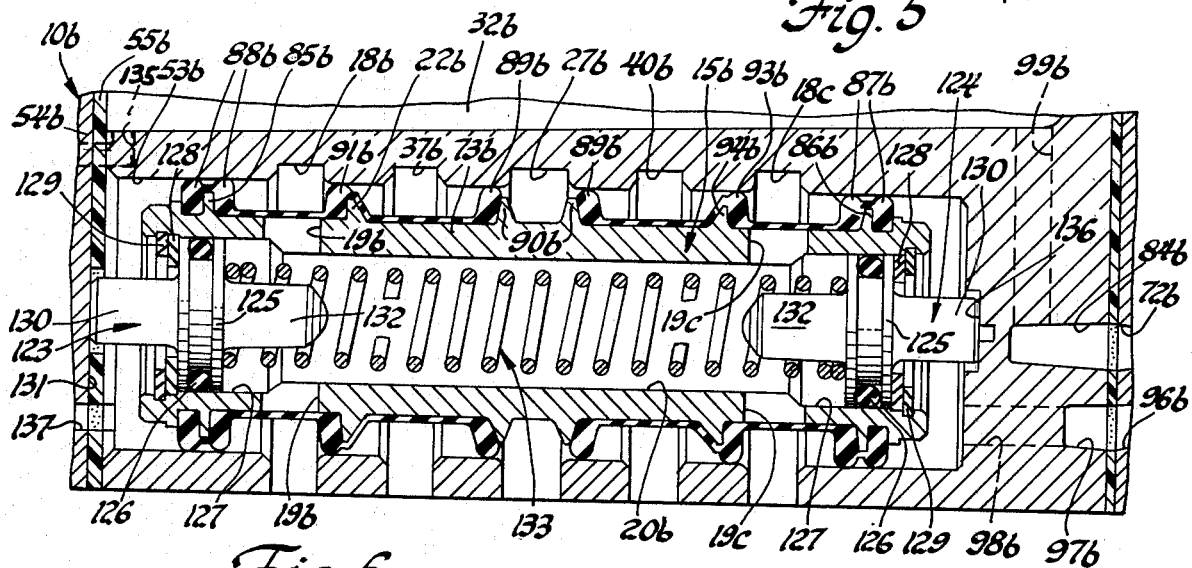
FIG. 6 is a fragmentary, elevation section view of a three-position, closed center, valve which is a four-way directional control air valve made in accordance with the principles of the present invention.

FIG. 6 is a fragmentary, longitudinal section view of a three-position, four-way air valve embodiment of the invention provided with a valve spool 15b having a flow path therethrough for the supply of air to the valve, and a centering spring in the valve spool 15b. The parts of the embodiment of FIG. 6 which are the same as the parts of the embodiment of FIGS. 1 through 5 have been marked with the same reference numerals, followed by the small letter "b", with one exception, wherein the main air supply chambers have been designated by the numerals 18b and 18c. The three-position air valve illustrated in FIG. 6 is a closed center air valve which is adapted to be operated either by a pair of suitable solenoid controlled pilot valves of the type illustrated by the numeral 13 in FIG. 3, or an external source of pressurized pilot air.

The valve spool 15b is operatively mounted in a longitudinal valve spool bore 53b in the valve body 11b. The valve spool 15b is normally disposed in a longitudinal centered or neutral position in the valve spool bore 53b, whereby the air supply chambers 18b and 18c are blocked from the two cylinder chambers 37b and 40b, and the exhaust chamber 27b is blocked from the cylinder chambers 37b and 40b. The valve spool 15b is shifted to the right and to the left, as viewed in FIG. 6, for selective connection to the supply chambers 18b and 18c with the cylinder chambers 37b and 40b, by the following described structure.

A longitudinally disposed centering spring, generally indicated by the numeral 133, is operatively mounted in the axial spool bore 20b, with the left end thereof abutting a centering piston, generally indicated by the numeral 123, and the right end thereof abutting a centering piston, generally indicated by the numeral 124. The valve spool 15b is provided with an inwardly extending, axial, enlarged diameter piston cylinder or bore 127 at each of the opposite ends thereof in which the centering pistons 123 and 124 are slidably mounted. As shown in FIG. 6, the centering piston 123 includes a piston body 125 which is slidably mounted in the left end bore 127 and which is provided with a peripheral groove in which is operatively mounted a suitable 0-ring seal 126. An outer axial, reduced diameter integral piston shaft 130 is formed on the outer side of the piston 125 and its outer end abuts the inner wall surface 131 of the cover plate 54b. An inner axial, reduced diameter integral shaft 132 is formed on the inner side of the piston 125 and it extends into the bore 20b, and one end of the centering spring 133 is seated over the shaft 132 and it abuts the inner side of the piston 125.

The piston 125 is retained against outward movement from the bore 127 by a retaining washer 128 and a retaining ring 129. However, the piston 125 may slide inwardly in the bore 127 to the inner end thereof during shifting movement of the valve spool 15b, as explained in detail hereinafter.

The centering piston 124 is constructed identical to the centering piston 123, and the same reference numerals have been used to indicate the corresponding piston parts. As shown in FIG. 6, the outer piston shaft 130 of the centering piston 124 abuts the end 136 of a recess formed in the closed end of the valve spool bore 53b when the valve spool 15b is in the center position shown in FIG. 6.

As shown in FIG. 6, the valve spool bore 20b forms a flow path for the supply of air which flows from the inlet ports 19b in FIG. 2 and through the bore 20b and out the ports 19c into the second supply chamber 18c. The pressurized supply of air in the bore 20b assists the centering spring 133 in its centering action when the valve spool 15b is returned to the central position of FIG. 6 after being shifted to the left or to the right, as explained hereinafter.

In use, the valve of FIG. 6 would be provided with a solenoid operated pilot valve on either end thereof. Any suitable pilot valves may be employed, as for example, two of the pilot valves 13 illustrated in the embodiment of FIGS. 1 through 5.

The pilot valve on the right end of the valve structure shown in FIG. 6 would receive pilot air under pressure from the accumulator 32b through the passageways 99b, 84b and 72b. When the pilot valve on the right end of the valve structure of FIG. 6 is operated, it would admit pressurized pilot air through the inlet passageway 96b, the passage 97b and passageway 98b into the closed right end of the valve spool bore 53b. The pilot air would then move the valve spool 15b to the left to open the passageway between the supply chamber 18b and the cylinder chamber 37b for supplying pressurized air to the cylinder chamber 37b. It will be understood that when the valve spool 15b is shifted to the left by the pilot air, that the centering piston 123 remains stationary compressing the centering spring 133 as the valve spool 15b is moving to its final shifted position against the cushion gasket 55b. Simultaneouisly, the exhaust chamber 27b is open to the cylinder 40b for exhausting the cylinder chamber 40b. When the pilot valve on the right end of the valve structure of FIG. 6 is de-energized, the pressurized air in the right end of the valve bore 53b is exhausted out through the passageways 98b, 97b and 96b, and out through the pilot valve, which action allows the centering spring 133 to return the spool valve 15b to the center or neutral position shown in FIG. 6.

The pilot valve on the left end of the valve structure of FIG. 6 would be supplied with pilot air through the accumulator chamber 32b through a suitable passageway 135. When the last mentioned solenoid pilot valve is energized, it would supply pilot air through the passageway 137 and into the chamber between the cover plate 54b and the left end of the valve spool 15b, and the valve spool 15b would be shifted to the right end of the valve bore 53b, and the piston 124 would be moved inwardly into the bore 127. When the valve spool 15b is shifted to the right end position, the supply chamber 18c is in communication with the cylinder chamber 40b, and the exhaust chamber 27b is in communication with the cylinder chamber 37b. When the solenoid on the left end of the valve structure of FIG. 6 is de-energized, the pilot air in the left end of the valve spool bore 53b is exhausted out through the passageway 137 and the last mentioned pilot valve, and the centering spring 133 functions to move the piston 124 and the valve spool 15b back to the neutral or center position shown in FIG. 6.

FIG. 6A is a fragmentary, elevation section view of a three-position centering valve structure operated in the same manner as the three-position centering valve of FIG. 6. The parts of the valve structure of FIG. 6A which are the same as the parts of FIG. 6 have been marked with the same reference numerals followed by the small letter "d". The valve of FIG. 6 shows a closed center valve, and the only difference between that valve and the valve of FIG. 6A, is that the valve of FIG. 6A is an open center valve. The central annular valve members 89b are disposed close together, so that when the valve spool 15b is in the neutral or centering position shown in FIG. 6, both of the cylinder chambers 37d and 40d are blocked from the supply chambers, but they are both open to the exhaust chamber 27d. The valve illustrated in FIG. 6A also has a supply air flow path formed therethrough by the valve spool bore 20d.

Figure 9:
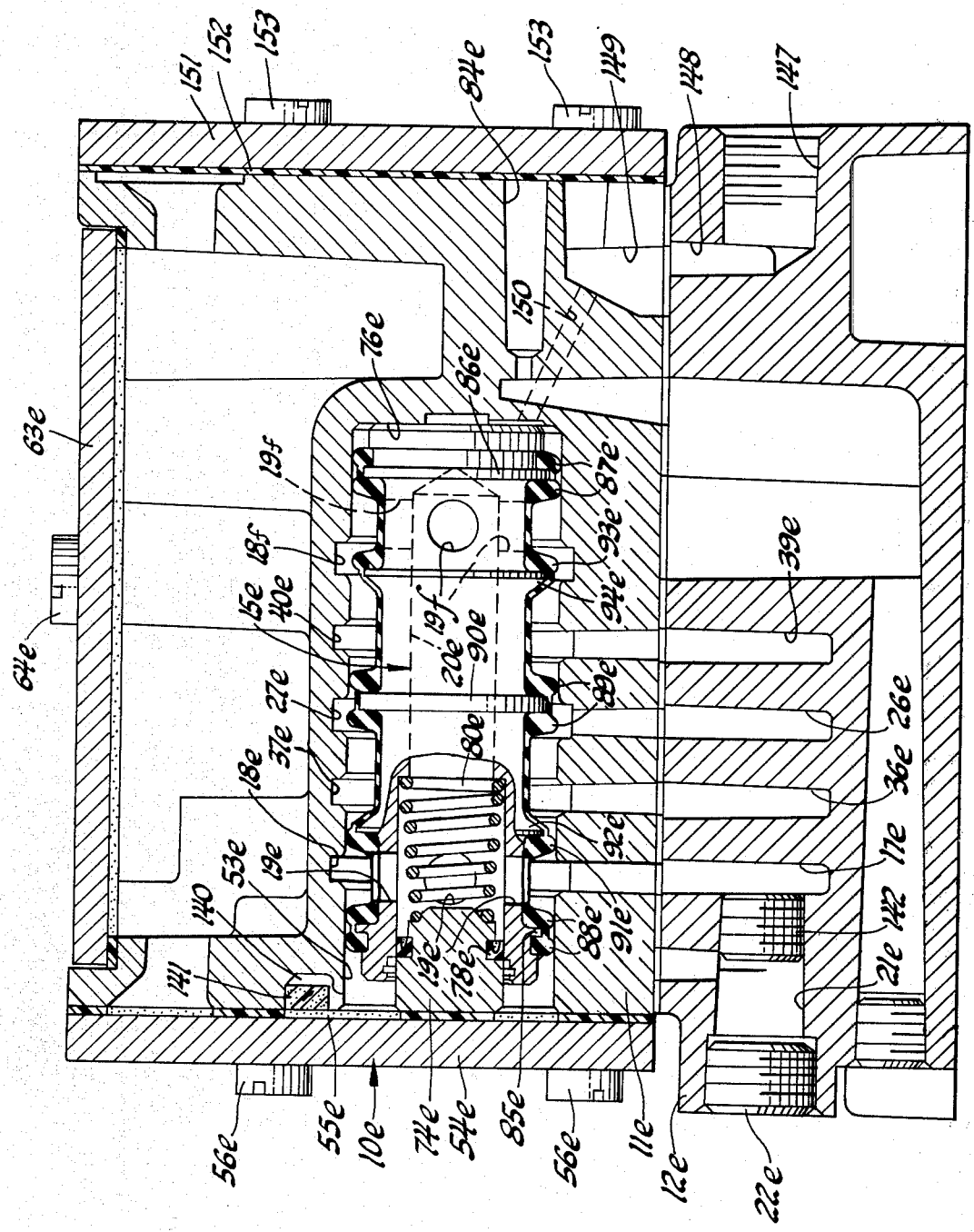
FIG. 9 is an enlarged, longitudinal section view of the valve illustrated in FIG. 8, taken along the line 9—9 thereof, and looking in the direction of the arrows.

FIGS. 7-11 illustrate a fourth embodiment of the invention which comprises a two-position, four-way air valve which is operated by an external source of pressurized pilot air. The parts of the embodiment of FIGS. 7 through 11 which are the same as the embodiment of FIGS. 1 through 5 have been marked with the same reference numerals, followed by the small letter "e". As shown in FIG. 9, the valve spool 15e has a supply air flow through a path formed therethrough by the bore 20e. The bore 20e is supplied with pressurized air from the inlet ports 19e, and pressurized air is conveyed through the bore 20e and the ports 19f into the second supply chamber 18f. In FIG. 9, the numeral 140 designates a vent chamber which is connected to the left end of the spool valve bore 53e and which communicates with the atmosphere through a suitable passageway provided with a filter 141. The valve body 11e is not provided with an accumulator chamber. The passage 21e is blocked from the air supply chamber 17e by a suitable pipe plug 142, if a double external pilot system is used to shift the valve spool 15e.

It will be understood that the two-position valve spool 15e illustrated in FIG. 9 is shifted from the initial position shown in FIG. 9 to the left by pressurized pilot air, and then it is returned to the position shown in FIG. 9 by the return spring 80e in the same manner as the valve spool 15 of the first embodiment of FIG. 3.

The pressurized pilot air is supplied from a suitable external source and it is conducted into the inlet port 147 in the valve base 12e, and it then flows through the passageway 148 into the passageway 149 and into the valve body 11e. The pilot air then flows through the passageway 150 and into the chamber in the inner closed end of the valve spool bore 53e and against the closed right end of the valve spool 15e, for shifting the valve spool 15e to the left to provide communication between the exhaust chamber 27e and the cylinder chamber 40e, and communication between the supply chamber 18e and the cylinder chamber 37e. When the pilot air supply is cut off, the pilot air would be exhausted from the right end of the valve spool bore 53e and exhausted out through the passageways 150, 149 and 148, and out through the port 147. The return spring 80e shifts the valve spool 15e to the right to the initial position shown in FIG. 9, to again connect the supply chamber 18f with the cylinder chamber 40e and the exhaust chamber 27e with the cylinder chamber 37e.

It will be understood that the valve spool 15 in the embodiment of FIG. 3 could have the left end thereof formed in the same manner as the right end and be shifted in both directions by pilot air. In such a valve the piston 74 and the return spring 80 is eliminated and a second solenoid operated pilot valve 13' (FIG. 1) would be employed at the left end of the valve.

While it will be apparent that the preferred embodiments of the invention herein disclosed are well calculated to achieve the results aforementioned, it will be appreciated that the invention is susceptible to modification, variation and change.

What is claimed is:

1. A directional control air valve having a valve body mounted on a base member a valve spool bore formed in the valve body in which a valve spool is movably mounted, the base member being provided with a pressurized air supply inlet port, an exhaust port, a first cylinder port and a second cylinder port, characterized in that:
   (a) a first pressurized air supply chamber is formed in the wall of said valve spool bore, and a second pressurized air supply chamber is formed in the wall of said valve spool bore in a position longitudinally spaced apart from the first pressurized air supply port;
   (b) said valve spool has a longitudinally disposed pressurized air flow chamber formed therein which is connected to said first and second pressurized air supply chambers, and to said pressurized air supply inlet port;
   (c) an exhaust chamber is formed in the wall of said valve spool bore in an intermediate position between said first and second pressurized air supply chambers for connection to said exhaust port;
   (d) a first cylinder chamber is formed in the wall of said valve spool bore in an intermediate position between said first pressurized air supply chamber and said exhaust chamber;
   (e) a second cylinder chamber is formed in the wall of said valve spool bore in an intermediate position between said second pressurized air supply chamber and said exhaust chamber;
   (f) said valve spool includes annular seal means at the ends thereof to seal said first and second pressurized air supply chambers from the end portions of the valve spool bore;
   (g) a plurality of annular valve seal members are mounted around the periphery of the valve spool between the annular seal means, and in longitudinal position spaced apart from each other and from the annular seal means, for controlling the flow of pressurized supply air between the first and second pressurized air supply chambers and the first and second cylinder chambers, and the flow of exhaust air between the first and second cylinder chambers and the exhaust chamber; and,
   (h) said valve includes means for moving the valve spool to a first position to connect said first pressurized air supply chamber with said first cylinder chamber and said exhaust chamber to said second cylinder chamber, and to a second position to connect the second pressurized air supply chamber with the second cylinder chamber and said exhaust chamber to said first cylinder chamber.

2. A four-way directional control air valve as defined in claim 1, characterized in that, said means for moving the valve spool to said first and second positions includes:
   (a) pilot air means for supplying pilot air to one end of the valve spool bore for moving the valve spool to said first position; and,
   (b) spring means, assisted by the pressurized air in the air flow chamber in the valve spool bore, for moving said valve spool from said first position to said second position, and wherein said second position comprises an initial position for the valve spool.

3. A four-way directional control air valve as defined in claim 2, characterized in that:
   (a) said pilot air means comprises a solenoid operated pilot air valve.

4. A four-way directional air valve as defined in claim 3, characterized in that:
   (a) said solenoid operated pilot air valve is supplied with pilot air from an accumulator chamber in the valve body, and the accumulator chamber is supplied with pressurized air from an internal air supply passageway in the valve.

5. A four-way directional air valve as defined in claim 4, characterized in that:
   (a) a check valve means is operatively mounted in said internal air supply passageway between the accumulator chamber and the air supply inlet port of the valve.

6. A four-way directional control air valve as defined in claim 2, characterized in that:
   (a) said pilot air means comprises a remote source of pressurized air.

7. A four-way directional control air valve as defined in claim 2, characterized in that:
   (a) said spring means is mounted in said air supply flow chamber in the valve spool with an inner end abutting a shoulder in the flow chamber and an outer end seated on a piston that has one end which is slidable mounted in an open end of the supply flow chamber and the other end seated against the adjacent closed end of the valve spool bore.

8. A four-way directional air valve as defined in claim 1, characterized in that said means for moving the valve spool to said first and second positions includes:
   (a) solenoid operated pilot air valve means for supplying pilot air to each end of the valve spool bore for moving the valve spool to said first and second positions.

9. A four-way directional air valve as defined in claim 8, characterized in that, the valve includes:
   (a) a spring means operatively mounted in the air supply flow chamber in the valve spool for moving the valve spool to a neutral third position when the pilot air valve means is inoperative.

10. A four-way directional control air valve as defined in claim 9, characterized in that:
    (a) the flow chamber in the valve spool extends through the valve spool from one end to the other;
    (b) a piston is movably mounted in each end of the flow chamber in the valve spool;
    (c) a retaining means is mounted in the valve spool chamber at each end to retain the pistons against outward movement; and,
    (d) the spring means is mounted in the flow chamber in the valve spool between said pistons and is assisted by the pressurized air in the air flow chamber to normally urge said pistons axially outward into engagement with said retaining means into an initial inoperative position against the adjacent closed end of the valve spool bore.

11. A four-way directional air valve as defined in claim 1, characterized in that said means for moving the valve spool to said first and second positions includes:
    (a) external pilot air means for supplying pilot air to each end of the valve spool bore for moving the valve spool to said first and second positions.

* * * * *

UNITED STATES PATENT OFFICE
CERTIFICATE OF CORRECTION

Patent No. 4,267,862        Dated May 19, 1981

Inventor(s) James A. Neff, Richard A. Fagerlie and Walter J. Bowman

It is certified that error appears in the above-identified patent and that said Letters Patent are hereby corrected as shown below:

Abstract, column 2, line 11, "an" should be --the--.

Column 6, line 43, "111" should be --11--.

Column 12, line 20, "position" should be --positions--.

Column 13, line 7, "slidable" should be --slidably--.

Signed and Sealed this

Eighteenth Day of August 1981

[SEAL]

Attest:

Attesting Officer

GERALD J. MOSSINGHOFF

Commissioner of Patents and Trademarks